H. BLUMENBERG, Jr.
PROCESS FOR RECOVERING POTASSIUM COMPOUNDS FROM WASTE GASES OF CEMENT KILNS OR THE LIKE.
APPLICATION FILED MAY 20, 1918.
1,296,466.
Patented Mar. 4, 1919.
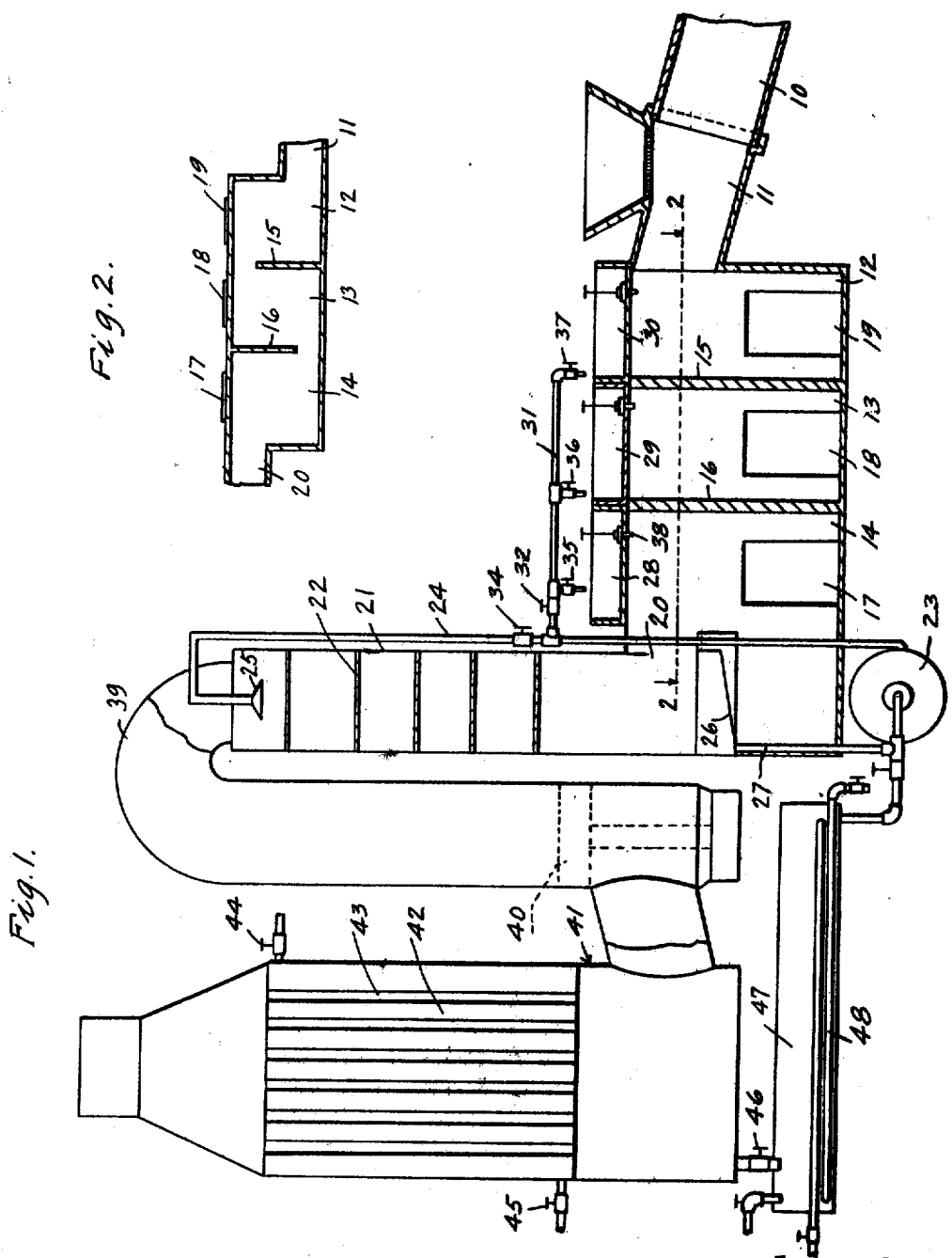
Inventor:
Henry Blumenberg Jr.
by Hazard & Miller
Attys.

UNITED STATES PATENT OFFICE.

HENRY BLUMENBERG, JR., OF ORO GRANDE, CALIFORNIA, ASSIGNOR TO CHEMICAL CONSTRUCTION COMPANY, OF LOS ANGELES, CALIFORNIA, A CORPORATION OF CALIFORNIA.

PROCESS FOR RECOVERING POTASSIUM COMPOUNDS FROM WASTE GASES OF CEMENT KILNS OR THE LIKE.

1,296,466.  Specification of Letters Patent.  Patented Mar. 4, 1919.

Application filed May 20, 1918. Serial No. 235,722.

*To all whom it may concern:*

Be it known that I, HENRY BLUMENBERG, Jr., a citizen of the United States, residing at Oro Grande, in the county of San Bernardino and State of California, have invented new and useful Improvements in Processes for Recovering Potassium Compounds from Waste Gases of Cement Kilns or the like, of which the following is a specification.

My invention relates to a process of recovering potassium compounds from waste gases.

In cement kilns that operate with potassium containing raw materials and produce potassium salts as a by-product, the waste gases are subjected to various treatments in order to recover or extract the potassium compounds carried thereby. Where baffle towers are used in which water or a salt solution is sprayed and contacted with the hot gases, it is necessary to retard the flow of the gases or to provide a sufficient number of baffle towers in order to recover substantially all the potassium compounds.

I have discovered that the potassium compounds may be easily extracted from the gases by subjecting them to a preliminary washing and cooling, saturating them with aqueous vapor and cooling them to approximately the freezing point of water. The condensation of the aqueous vapor on condensing will precipitate all the solid matter carried in said gases, including the potassium compounds which may be separated from the constituents of the aqueous solution by the usual methods.

My invention consists in the steps of the process hereinafter described and claimed.

In the accompanying drawings which form a part of this specification I have shown an apparatus suitable for carrying on my process, and in which:

Figure 1 is a vertical section thereof.

Fig. 2 is a horizontal section taken on the line 2—2 of Fig. 1.

Referring to the drawings, 10 indicates the upper end of a cement kiln which is in communication with a conduit 11 leading to a series of dust collecting and cooling chambers 12, 13 and 14 but which may consist of any desired number. These heating chambers communicate with each other by means of passages formed respectively by the vertical baffle walls 15 and 16 arranged in staggered relation as clearly shown in Fig. 2. 17, 18 and 19 are suitable doors in the side walls of the dust collecting chambers through which the collected dust may be removed. A passage 20 leads from the last chamber 14 into a baffle or precipitating tower 21 provided with horizontal perforated baffle plates 22. 23 is a centrifugal pump for circulating water by means of pipe 24 and spray nozzle 25 through the precipitating tower 21. The liquid collected in the inclined bottom 26 of the precipitating tower 21 is returned by means of pipe 27 to the pump 23. When the water has collected a sufficient amount of cement dust containing potassium compounds, so that the resulting magma or slurry is handled with difficulty by the pump 23, it is pumped into a series of evaporating pans 28, 29 and 30 by means of a branch pipe 31 leading from pipe 24 and which is provided with a valve 32. 34 is a valve in the pipe 24 which is closed when the valve 32 is opened to divert the slurry into said pans. 35, 36 and 37 are valved outlet pipes leading from the branch pipe 31 into evaporating pans 28, 29 and 30, respectively. Each pan is provided with valved outlets 38 through which the slurry after the desired degree of concentration has been reached is allowed to flow into the dust collecting chambers 12, 13 and 14.

The gases after passing through the precipitating tower 21 are drawn through conduit 39 by means of a blower or fan 40 into the lower part of the refrigerator 41 where the rest of the cement dust and potassium compound is recovered. The refrigerator 41 is provided with a central cooling portion consisting of a condenser 42 through which a series of spaced vertical pipes 43 open at both ends are arranged. The cooling medium preferably brine, of a temperature considerably below the 32° F. is admitted through the valved outlet 44. 45 is a valved outlet for the brine. The gases coming from the precipitating tower 21 are considerably cooled, preferably down to 120° to 160° F. and are saturated with aqueous vapor which on passing through the pipes 43 are condensed. The condensation of the aqueous vapor forms a fog which collects all the dust particles carried in suspension by the gases, and the condensed water containing the dust and potassium compounds is collected in the bottom of the refrigerator 41 whence the same is run through a valved outlet pipe 46 into an evaporating pan 47 provided with a suitable steam coil 48. Here the mixture is concentrated and potassium compounds may be separated from the other constituents of the mixture by the usual methods.

The essential feature of this invention is the cooling of the gases which have been subjected as described to a preliminary washing and cooling to a temperature preferably not above 40° F. whereby, through the condensation of the aqueous vapor, the remaining potassium compounds carried by the gases are recovered.

I claim:

A process of recovering potassium compounds from the waste gases of cement kilns and the like, comprising subjecting said gases to a preliminary cooling of 200° F. and saturating the same with an aqueous vapor, and cooling said gases to about 40° F., by passing them through a refrigerating zone, whereby the aqueous vapor is condensed and collects the potassium compounds.

In testimony whereof I have signed my name to this specification.

HENRY BLUMENBERG, Jr.